United States Patent
Huang et al.

(10) Patent No.: US 12,474,923 B2
(45) Date of Patent: Nov. 18, 2025

(54) MODEL CONSTRUCTION METHOD AND APPARATUS, AND MEDIUM AND ELECTRONIC DEVICE

(71) Applicant: Lemon Inc., Grand Cayman (KY)

(72) Inventors: Ruoxing Huang, Beijing (CN); Junyuan Xie, Beijing (CN); Longyijia Li, Beijing (CN); Chenliaohui Fang, Beijing (CN); Shihao Shen, Beijing (CN); Lei Shi, Beijing (CN); Lingyuan Zhang, Beijing (CN); Peng Zhao, Beijing (CN); Deliang Fan, Beijing (CN); Di Wu, Beijing (CN); Xiaobing Liu, Los Angeles, CA (US)

(*) Notice: Subject to any disclaimer, the term of this patent is extended or adjusted under 35 U.S.C. 154(b) by 250 days.

(21) Appl. No.: 18/252,942

(22) PCT Filed: Nov. 16, 2021

(86) PCT No.: PCT/SG2021/050709
§ 371 (c)(1),
(2) Date: May 15, 2023

(87) PCT Pub. No.: WO2022/108529
PCT Pub. Date: May 27, 2022

(65) Prior Publication Data
US 2024/0012641 A1   Jan. 11, 2024

(30) Foreign Application Priority Data
Nov. 19, 2020   (CN) .......................... 202011308363.3

(51) Int. Cl.
*G06F 8/71*   (2018.01)
*G06F 16/955*  (2019.01)
(Continued)

(52) U.S. Cl.
CPC ............ *G06F 8/71* (2013.01); *G06F 16/9558* (2019.01); *G06N 3/098* (2023.01); *H04L 63/101* (2013.01)

(58) Field of Classification Search
CPC ....... G06F 8/71; G06F 16/9558; G06N 3/098; H04L 63/101
See application file for complete search history.

(56) References Cited

U.S. PATENT DOCUMENTS

| | | | |
|---|---|---|---|
| 10,873,578 B1 | 12/2020 | Rose | |
| 11,663,472 B2 * | 5/2023 | Wang | ..................... H04B 7/026 706/25 |

(Continued)

FOREIGN PATENT DOCUMENTS

| | | |
|---|---|---|
| CN | 110197285 A | 9/2019 |
| CN | 110633806 A | 12/2019 |

(Continued)

OTHER PUBLICATIONS

Li Yue et al., Federation Learning Modelling Method, Device and Readable Storage Medium, translation of CN 111598254 A, 2020 (Year: 2020).*

(Continued)

*Primary Examiner* — Douglas M Slachta
(74) *Attorney, Agent, or Firm* — Alleman Hall & Tuttle LLP

(57) ABSTRACT

A model construction method and an apparatus, and a medium and an electronic device are disclosed. The method is applied to a first participant platform, and includes: associating first configuration information pre-created by a first participant with second configuration information pre-created by a second participant; verifying the first configuration information; sending, to a second participant platform corresponding to the second participant, a second creation request for requesting the creation of the federated learning (Continued)

model, to cause the second participant platform to verify the second configuration information creating a first model task on the basis of a first parameter corresponding to the first configuration information; and performing co-training on the basis of the first model task and a second model task, to obtain the federated learning model.

17 Claims, 3 Drawing Sheets

(51) Int. Cl.
*G06N 3/098* (2023.01)
*H04L 9/40* (2022.01)

(56) References Cited

U.S. PATENT DOCUMENTS

| | | | | |
|---|---|---|---|---|
| 11,699,080 | B2 * | 7/2023 | Zhu | G06N 5/01 |
| | | | | 706/12 |
| 11,848,027 | B2 * | 12/2023 | Krishnan | G10L 25/30 |
| 12,099,933 | B2 * | 9/2024 | da Silva | G06N 3/098 |
| 2018/0018590 | A1 * | 1/2018 | Szeto | G16H 10/60 |
| 2020/0218937 | A1 | 7/2020 | Visentini Scarzanella et al. | |
| 2020/0401890 | A1 | 12/2020 | Xu et al. | |
| 2021/0174257 | A1 * | 6/2021 | Pothula | G06F 16/289 |
| 2022/0101204 | A1 * | 3/2022 | Ly | G06N 3/08 |
| 2022/0129786 | A1 * | 4/2022 | da Silva | G06N 3/098 |
| 2023/0325679 | A1 * | 10/2023 | Wang | G06N 3/045 |
| | | | | 706/25 |
| 2025/0209383 | A1 * | 6/2025 | Hu | G06N 5/04 |

FOREIGN PATENT DOCUMENTS

| | | | | |
|---|---|---|---|---|
| CN | 111104731 | A | | 5/2020 |
| CN | 111125779 | A | | 5/2020 |
| CN | 111338608 | A | | 6/2020 |
| CN | 111538598 | A | | 8/2020 |
| CN | 111598254 | A | * 8/2020 | ........... G06F 21/602 |
| CN | 111612168 | A | | 9/2020 |
| CN | 111666987 | A | | 9/2020 |
| CN | 111768008 | A | | 10/2020 |
| CN | 111797424 | A | | 10/2020 |
| CN | 111860865 | A | | 10/2020 |
| CN | 111935157 | A | | 11/2020 |
| CN | 111950739 | A | | 11/2020 |

OTHER PUBLICATIONS

Awan, S. et al., "Poster: A Reliable and Accountable Privacy-Preserving Federated Learning Framework using the Blockchain," Proceedings of the 26th ACM Conference on Computer and Communications Security, Nov. 11, 2019, London, United Kingdom, 3 pages.

China National Intellectual Property Administration, Notice of Allowance Issued in Application No. 202011308363.3, Aug. 30, 2023, 5 pages.

Li, Y. et al., "Research on the Application of Big Data and Blockchain Technology in the Financial Support of the Real Economy," Jilin Financial Research, vol. 9, Sep. 15, 2020, 3 pages. Submitted with English abstract.

Mu, Q., "Detailed explanation of federated learning Federated Learning," Zhihu Website, Available Online at zhuanlan.zhihu.com/p/79284686, Sep. 8, 2020, 20 pages.

China National Intellectual Property Administration, Office Action and Search Report Issued in Application No. 202011308363.3, Apr. 19, 2023, 17 pages.

ISA Intellectual Property Office of Singapore, Written Opinion Issued in Application No. PCT/SG2021/050709, Jan. 25, 2022, WIPO, 21 pages.

* cited by examiner

MODEL CONSTRUCTION METHOD AND APPARATUS, AND MEDIUM AND ELECTRONIC DEVICE

CROSS-REFERENCE TO RELATED APPLICATIONS

The present application is a U.S. National Stage Application under 35 U.S.C. § 371 of International Patent Application No. PCT/SG2021/050709, filed on Nov. 16, 2021, which claims priority to China Patent Application No. 202011308363.3 filed on Nov. 19, 2020, the disclosure of both of which are incorporated by reference herein in entirety.

TECHNICAL FIELD

The present disclosure relates to a model construction method, apparatus, medium, and electronic device.

BACKGROUND

Federated machine learning, also known as federated learning or joint learning, has been increasingly applied in the field of machine learning. Federated learning can address issues such as data silos and data privacy, in which multiple participants train federated learning models together. Instead of exchanging data, federated learning participants only need to exchange model parameters and gradients, so that all data can be modeled while maintaining data privacy.

SUMMARY

The summary is provided for a concise introduction of the concept of the present disclosure, which will be described in detail in the Detailed Description below. The summary is not intended to identify critical features or essential features of the claimed technical solution, nor is it intended to be used to limit the scope of the claimed technical solution.

In a first aspect, the present disclosure provides a model construction method applied to a first participant platform. The model construction method comprises: associating first configuration information pre-created by a first participant with second configuration information pre-created by a second participant in response to receiving a first creation request sent from the first participant and configured to request creation of a federated learning model; verifying the first configuration information; sending a second creation request for requesting the creation of the federated learning model to a second participant platform corresponding to the second participant in a case where verification of the first configuration information is passed, to cause the second participant platform to verify the second configuration information in response to the second creation request; creating a first model task based on a first parameter corresponding to the first configuration information in a case of receiving a confirmation message sent from the second participant platform and configured to indicate that verification of the second configuration information is passed; and performing co-training based on the first model task and a second model task to obtain the federated learning model, wherein the second model task is created by the second participant platform based on a second parameter corresponding to the second configuration information in a case where the verification of the second configuration information is passed.

In a second aspect, a model construction apparatus applied to a first participant platform is provided. The model construction apparatus comprises: an association module configured to associate first configuration information pre-created by a first participant with second configuration information pre-created by a second participant in response to receiving a first creation request sent from the first participant and configured to request creation of a federated learning model; a verification module configured to verify the first configuration information; a sending module configured to send a second creation request for requesting the creation of the federated learning model to a second participant platform corresponding to the second participant in a case where verification of the first configuration information is passed, to cause the second participant platform to verify the second configuration information in response to the second creation request; a creation module configured to create a first model task based on a first parameter corresponding to the first configuration information in a case of receiving a confirmation message sent from the second participant platform and configured to indicate that verification of the second configuration information is passed; and a training module configured to perform co-training based on the first model task and a second model task to obtain the federated learning model, wherein the second model task is created by the second participant platform based on a second parameter corresponding to the second configuration information in a case where the verification of the second configuration information is passed.

In a third aspect, there is provided a non-transitory computer-readable medium having a computer program stored thereon, wherein the computer program, when executed by a processing device, implements the model construction method described in the first aspect.

In a fourth aspect, there is provided an electronic device, comprising: a storage device having a computer program stored thereon; and a processing device configured to execute the computer program in the storage device to implement the model construction method described in the first aspect.

In a fifth aspect, there is provided a computer program, comprising: instructions that, when executed by a processor, cause the processor to execute the model construction method described in the first aspect.

In a sixth aspect, there is provided a computer program product, comprising instructions that, when executed by a processor, cause the processor to execute the model construction method described in the first aspect.

Other features and advantages of the present disclosure will be explained in detail in the subsequent specific embodiments.

BRIEF DESCRIPTION OF THE DRAWINGS

The above and other features, advantages, and aspects of the embodiments of the present disclosure will become more apparent from the following embodiments with reference to the drawings. Throughout the drawings, the same or similar reference signs indicate the same or similar elements. It should be understood that the drawings are schematic and the components and elements are not necessarily drawn to scale. In the drawings.

DETAILED DESCRIPTION

Exemplary embodiments of the present disclosure will now be described in detail with reference to the accompanying drawings. Although some embodiments of the present disclosure are shown, it should be understood that the present disclosure can be implemented in various forms, and should not be construed as being limited to the embodiments set forth herein. On the contrary, these embodiments are provided for a more thorough and complete understanding of the present disclosure. It should be understood that the drawings and embodiments of the present disclosure are only used for exemplary purposes, and are not used to limit the scope of protection of the present disclosure.

It should be understood that the various steps described in the methods of the embodiments of the present disclosure may be executed in a different order, and/or executed in parallel. In addition, the methods may comprise additional steps and/or some of the illustrated steps may be omitted. The scope of the disclosure is not limited in this regard.

The term "comprising" and its variants as used herein is an open-ended mode expression, that is, "comprising but not limited to". The term "based on" means "based at least in part on". The term "one embodiment" means "at least one embodiment"; the term "another embodiment" means "at least one additional embodiment"; and the term "some embodiments" means "at least some embodiments". Related definitions of other terms will be given in the following description.

It should be noted that the concepts mentioned in the present disclosure, such as "first" and "second", etc., are only used to distinguish different devices, modules or units, and are not used to limit the order or interdependence of functions performed by these devices, modules or units.

It should be noted that the modifications of "a" and "a plurality of" mentioned in the present disclosure are illustrative and not restrictive, and those skilled in the art should understand that unless clearly indicated in the context, they should be understood as "one or more".

The names of messages or information exchanged between multiple devices in the embodiments of the present disclosure are only used for illustrative purposes, and are not used to limit the scope of these messages or information.

In the related art, when the participants of federated learning construct the federated learning model, the user usually needs to learn and master various stages of a modeling process of the federated learning model, and then the user needs to manually participate in each stage to accomplish the modeling process of the federated learning model, which requires high technical requirements and low modeling efficiency for the user.

In view of this, embodiments of the present disclosure provide a model construction method to improve the efficiency of model creation.

Figure 1:
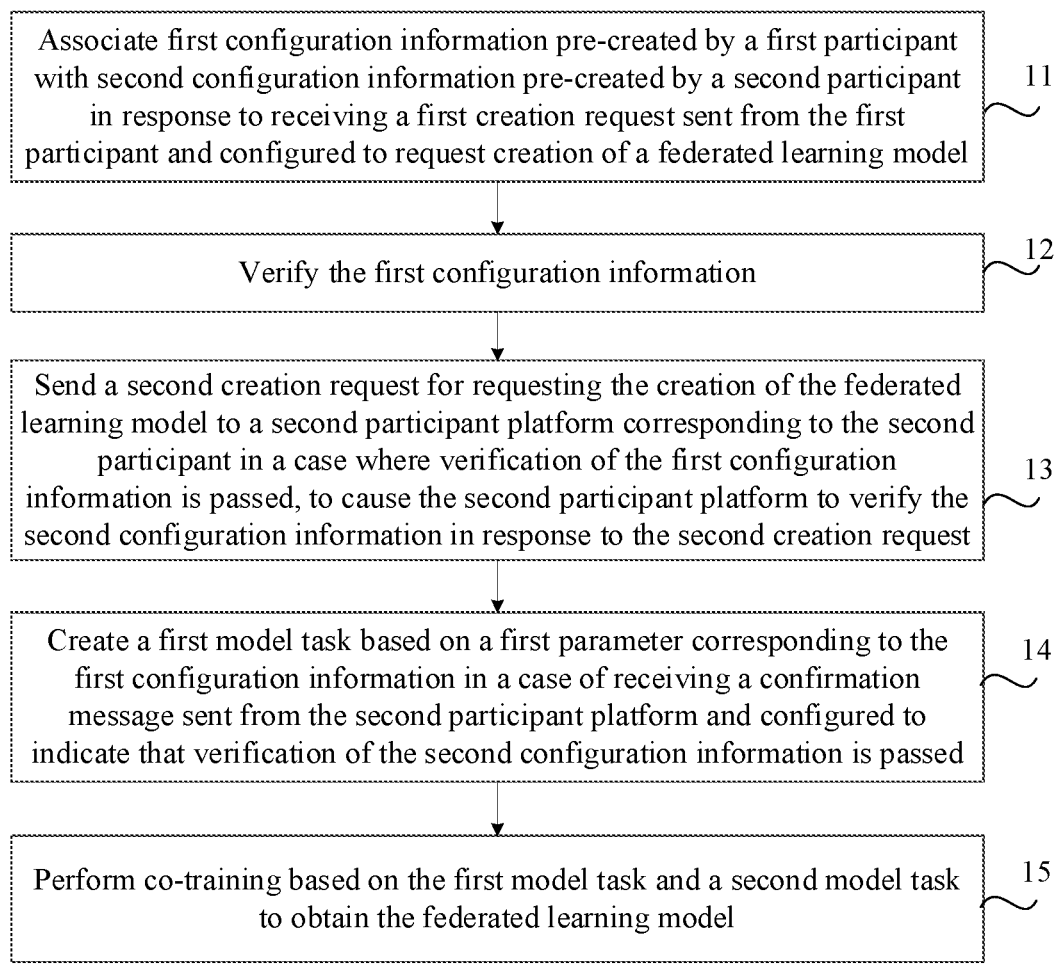
FIG. 1 is a flowchart of a model construction method according to an embodiment of the present disclosure.

FIG. 1 is a flowchart of a model construction method according to an embodiment of the present disclosure. For example, the method is applied on a first participant platform and comprises steps 11 to 15.

In step 11, first configuration information pre-created by a first participant is associated with second configuration information pre-created by a second participant in response to receiving a first creation request sent from the first participant and configured to request creation of a federated learning model.

In an embodiment of the present disclosure, the federated learning model is constructed by two or more participants, such as Enterprise A, Enterprise B, Enterprise C, etc. In the step, two participants can be selected as the first and second participants, to ensure the association among multiple participants through multiple selections. For example, when creating a federated learning model, one enterprise can be used as the first participant and all other enterprises can be used as the second participant, thereby achieving the association among multiple participants. For example, if Enterprise A is designated as the first participant, Enterprise B and Enterprise C can serve as the second participant, thereby achieving the association among multiple participants, i.e., Enterprise A, Enterprise B, and Enterprise C. The foregoing is by way of example only and is not intended to be a limitation of the disclosure. The first participant platform may be a platform on which the first participant performs privatization deployment to effectively protect the data privacy and security of the participant. Optionally, the participant platform may also provide web services through interface services to enable access to web pages and ease of use.

As an example, the first participant and the second participant can pre-create their configuration information on their respective participant platforms. Taking the first configuration information pre-created by the first participant as an example, the first configuration information may comprise CPU (Central Processing Unit) and memory usage requirements of a server corresponding to the first participant, as well as configuration information of parameters of a target model and a template model selected by the first participant. Similarly, the second configuration information corresponding to the second participant can be configured in the same way. For example, the configuration information can be created and stored using a Ticket mechanism, and the specific form of storage will not be described in detail herein.

In some embodiments, when obtaining the second configuration information corresponding to the second participant platform, the first participant platform can send a configuration information acquisition request to the second participant platform, to cause the second participant platform to send the second configuration information to the first participant platform in response to the configuration information acquisition request. Thereafter, the first participant platform can associate the first configuration information with the second configuration information in response to the first creation request, so as to subsequently create a federated learning model corresponding to the first participant and the second participant. The first participant platform can communicate with the second participant platform through the gRPC (Google Remote Procedure Call) protocol as the basic communication protocol and communication framework.

In step 12, the first configuration information is verified. The step is used to verify the validity of the first configuration information. Verification can be carried out by setting corresponding validity verification rules. For example, verification rules such as an available CPU capacity verification, an available memory capacity verification, and a model parameter configuration type can be set. For example, if verification rule R1 is that the available CPU capacity is greater than M, and when the available CPU capacity of the server corresponding to the current first participant is less than M, it means that the first configuration information cannot pass the verification rule R1. It should be noted that verification rules can be set according to actual application scenarios, and are not specifically limited in the disclosure. There may be several verification rules, and in the step, the verification can be performed one by one based on each verification rule in a predetermined order.

In step 13, a second creation request for requesting the creation of the federated learning model is sent to a second participant platform corresponding to the second participant in a case where verification of the first configuration information is passed, to cause the second participant platform to verify the second configuration information in response to the second creation request As an example, if the first configuration information satisfies the various verification rules, it is determined that the verification of the first configuration information is passed. Otherwise, it is determined that the verification of the first configuration information is not passed. When the verification of the first configuration information is passed, it indicates that the model task corresponding to the first participant can be created on the first participant platform. Because the federated learning model needs to be trained by the participants in a collaborative manner, in this situation, a second creation request for requesting the creation of the federated learning model can be sent to the second participant platform corresponding to the second participant in the embodiment, to cause the second participant platform to verify the second configuration information in response to the second creation request, that is, to cause the second participant platform to determine whether a model task corresponding to the second participant can be created. The method of verifying the configuration information of a participating platform has been explained above and will not be repeated here. The same or different verification rules can be set on the corresponding participant platform of each participant, which can be set according to actual application scenarios and are not specifically limited in the disclosure.

In step 14, a first model task is created based on a first parameter corresponding to the first configuration information in a case of receiving a confirmation message sent from the second participant platform and configured to indicate that verification of the second configuration information is passed.

In the step, in the case of receiving the confirmation message sent from the second participant platform and configured to indicate that verification of the second configuration information is passed, it means that the second participant platform can create a second model task corresponding to the second participant. In the situation, both federated learning participants can create their respective model tasks, so that a first model task can be created based on the first parameter corresponding to the first configuration information. The first parameter corresponding to the first configuration information is a configuration parameter in the first configuration information.

In step 15, co-training is performed based on the first model task and the second model task to obtain the federated learning model, wherein the second model task is created by the second participant platform based on a second parameter corresponding to the second configuration information in a case where the verification of the second configuration information is passed.

The second participant platform can create the second model task based on the second parameter corresponding to the second configuration information after the verification of the second configuration information is passed. The implementation method of the step is the same as that of creating the first model task described above, and will not be repeated here. For example, the first model task and the second model task are model configuration tasks. Taking the first model task as an example, a corresponding target model can be selected according to a type of a model indicated by the first parameter, and a parameter can be configured for the selected target model according to parameter setting indicated by the first parameter, so that a federated learning sub-model used by the first federated learning participant can be created. Similarly, a federated learning sub-model for the second participant to perform federated learning can be created by the second federated learning participant. After obtaining an initial model of the federated learning model, the initial model can be trained based on training samples to obtain a trained federated learning model.

In the above technical solution, first configuration information pre-created by a first participant can be associated with second configuration information pre-created by a second participant in response to receiving a first creation request sent from the first participant and configured to request creation of a federated learning model. Thereafter, verification is performed for the first configuration information, and a second creation request for requesting the creation of the federated learning model is sent to a second participant platform corresponding to the second participant in a case where verification of the first configuration information is passed, to cause the second participant platform to verify the second configuration information in response to the second creation request; a first model task is created based on a first parameter corresponding to the first configuration information in a case of receiving a confirmation message sent from the second participant platform and configured to indicate that verification of the second configuration information is passed; thereafter, co-training is performed based on the first model task and a second model task to obtain the federated learning model, wherein the second model task is created by the second participant platform based on a second parameter corresponding to the second configuration information in a case where the verification of the second configuration information is passed. Therefore, through the above technical solution, the automatic creation of a federated learning model can be achieved through the above communication process by the participant platforms based on the configuration information pre-created by the first participant and the second participant involved in the construction of the federated learning model. In the process, there is no need for manual user intervention, which can improve the efficiency of model creation, reduce technical requirements for staff, reduce the workload of staff, and improve user experience. In addition, in the above technical solution, the steps of creating corresponding model tasks are executed only after both parties involved in the construction of the federated learning model are determined to be able to create corresponding model tasks. This can effectively avoid the creation of invalid tasks, which can improve the efficiency of model construction to a certain extent and reduce the amount of data processing required during the model construction process.

In some embodiments, in order to further ensure data security in the communication process between the first participant platform and the second participant platform, the second configuration information of the second participant can be obtained by: sending a configuration information acquisition request to the second participant platform, to cause the second participant platform to determine the second configuration information based on identification information of the first participant in a case where the identification information of the first participant is obtained from the configuration information acquisition request, and send the second configuration information to the first participant platform.

For each participant in federated learning, a federated entity can be created in its corresponding participant platform, and identification information of that participant and server addresses of other participants can be maintained in its configuration information pre-created to facilitate communication with other participant platforms. The identification information of a participant may be a protocol header of a HTTP (Hypertext Transfer Protocol) request to uniquely identify the participant. Therefore, the first participant platform can send a configuration information acquisition request to the second participant platform based on the server address of the second participant platform that it maintains.

When the second participant platform receives the configuration information acquisition request, it can determine whether the configuration information acquisition request comprises identification information. If the configuration information acquisition request does not comprise identification information, it means that the configuration information acquisition request is an illegal request and a request error prompt can be returned. If the configuration information acquisition request comprises identification information, a federated entity corresponding to the identification information can be queried based on the identification information, to determine whether the participant identified by the identification information is a legal participant. If the federated entity corresponding to the identification information cannot not found, a federation error prompt can be returned; if the federated entity corresponding to the identification information is found, it indicates that the participant initiating the configuration information acquisition request is a legal participant. A participant can have configuration information for each of the other participants in the federation learning, and then use the identification information to search the configuration information corresponding to the identification information in the configuration information of the second participant as the second configuration information, and send the second configuration information to the first participant platform. The above configuration information can be obtained before receiving the creation request, so that the corresponding configuration information can be associated directly when the creation request is received; or the configuration information can be obtained after receiving the creation request, which is not limited in the disclosure.

It should be noted that the above verification method is not limited to the verification of the configuration information acquisition request. Any request initiated in the communication between the first participant platform and the second participant platform can be verified for the legality of the participant through a similar verification method, thereby effectively ensuring the security of the participant platforms during the communication, and to some extent ensuring the security of data of the participant, thereby improving user experience.

Figure 2:
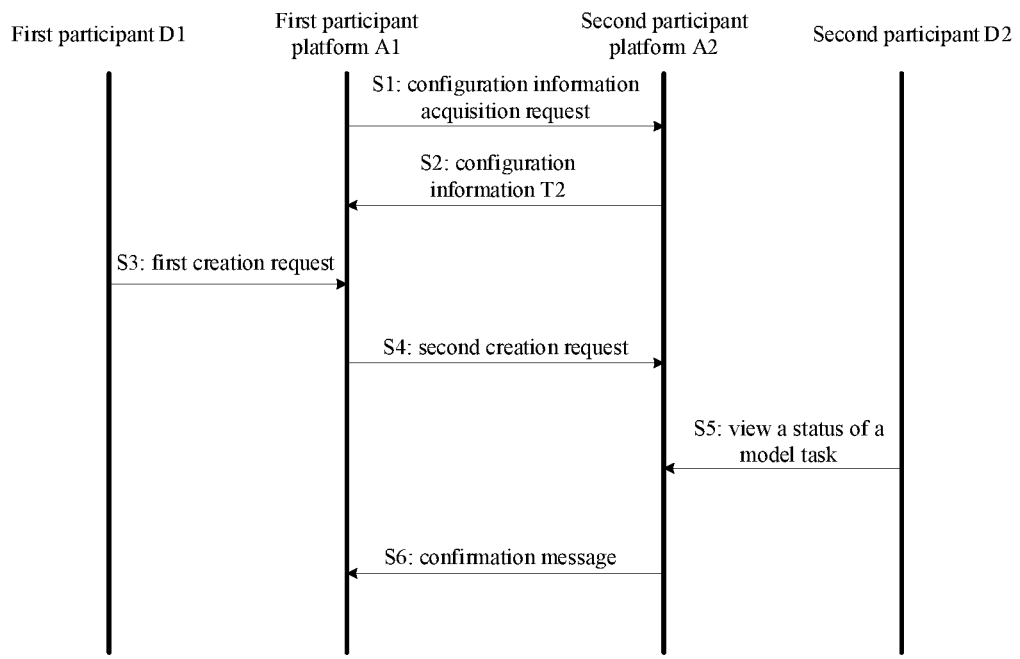
FIG. 2 is a schematic diagram of communication flows in a model construction process according to an embodiment of the present disclosure.

FIG. 2 is a schematic diagram of communication flows in a model construction process according to an embodiment of the present disclosure. For example, the first participant platform A1 sends a configuration information acquisition request through step S1, and when the second participant platform A2 receives the configuration information acquisition request, the second participant platform A2 can obtain the identification information of the first participant platform A1 from the configuration information acquisition request, determine configuration information T2 through the above process, and send the configuration information T2 to the first participant platform through step S2. Thereafter, the first participant D1 sends a first creation request to the first participant platform through step S3. The first participant platform A1 can then associate the configuration information T1 of the first participant with the configuration information T2 of the second participant based on the first creation request, and sends a second creation request to the second participant platform A2 through step S4 after the configuration information T1 passes verification. The second participant platform A2 can verify the configuration information T2, and create a model task M2 based on the configuration information after the verification is passed. Each participant can communicate through its corresponding participant platform to monitor the status of the model task and other information such as metrics during the training process of the model task. For example, the second participant D2 views a status of a model task through step S5. The second participant platform A2 can send a confirmation message to the first participant platform A1 through step S6 to notify the first participant platform A1. Thereafter, the first participant platform A1 can create a model task M1 based on configuration information T1. Therefore, through the above communication process, the first participant platform A1 creates the model task M1, and the second participant platform creates the model task M2, and the co-training is performed based on the model task M1 and the model task M2 to obtain a federated learning model. The specific implementation of the above steps has been detailed previously, and will not be repeated here.

In some embodiments, the second creation request comprises the first parameter corresponding to the first configuration information to enable the second participant platform to verify the first parameter. In practical application scenarios, the security requirements for user data in federated learning scenarios are relatively high. In two parties conducting the federation learning, each party may not trust the verification performed by the other party. Moreover, each of them may set verification rules different from the other. Therefore, in the embodiment, the first parameter verified by the first participant platform can be sent to the second participant platform for a secondary verification to ensure the effectiveness of the first parameter.

Correspondingly, the creating of the first model task based on the first parameter corresponding to the first configuration information in a case of receiving a confirmation message sent from the second participant platform and configured to indicate that the verification of the second configuration information is passed comprises: creating the first model task based on the first parameter corresponding to the first configuration information in a case of receiving the confirmation message sent from the second participant platform and configured to indicate that the verification of the second configuration information is passed and verification of the first parameter is passed.

As an example, the confirmation messages indicating that the verification of the second configuration information is passed and the verification of the first parameter is passed can be fed back to the first participant platform as a same confirmation message. For example, after the verification of the second configuration information and the verification of the first parameter are completed and passed, the confirmation message is sent to the first participant platform. If the verification of the second configuration parameter and/or the verification of the first parameter is not passed, there is no need to send a message to the first participant platform, or a message for indicating that the verification is not passed can be sent to the first participant. As another example, after the verification of the second configuration parameter is passed, a confirmation message is sent to the first participant platform to indicate that the verification of the second configuration information is passed, and after the verification of the first parameter is passed, another confirmation message is sent to the first participant platform to indicate that the verification of the first parameter is passed. Therefore, through the above technical solution, the first parameter can be verified twice, thereby further improving the reliability and performability of the created model task, and ensuring the data security of both federated learning parties during the modeling process.

In some embodiments, the method further comprises: outputting prompt information to the first participant in a case where the verification of the first configuration information is not passed, wherein the prompt information is configured to prompt that the verification is not passed and/or to prompt for information of a verification item that does not pass the verification.

As shown in the above embodiment, multiple verification rules can be pre-set to verify the configuration information. Therefore, if the verification of the configuration information is not passed, it means that the corresponding model task cannot be created based on the configuration information. In this case, a prompt message can be output to the corresponding participant to inform the user corresponding to the participant that the verification of the current configuration information is not passed. As another example, based on a failed verification rule corresponding to the configuration information, information of a parameter that does not pass the verification in the corresponding configuration information and information of a corresponding verification rule can be further determined. For example, for the verification rule R1 described above, the parameter information can be determined as CPU information when the verification is not passed, and the verification rule information is "verification rule R1". The parameter and verification rule information can then be used as prompt information of verification items. In this way, a more accurate prompt can be provided to the participating user, which not only makes it easier for the user to detect errors in the configuration information in a timely manner, but also provides precise positioning for their modifications to meet their usage needs. In addition, it also eliminates the need for the user to manually troubleshoot the cause of the error, and thus further improving the user experience. Correspondingly, if the verification of the second configuration information performed by the second participant platform is not passed, the second participant can also be prompted in the above method, which will not be repeated here.

In some embodiments, the first model task is a data intersection task. In vertical federation learning, two datasets have more overlapping users and less overlapping user features. In this case, it is necessary to segment the datasets vertically (i.e., in the feature dimension) and extract data elements that contain the same users but not exactly the same user features for training. Therefore, in the embodiment, data intersection is used to determine the data corresponding to the same user in the datasets of both participating parties. An exemplary method of the performing of the co-training based on the first model task and the second model task to obtain the federated learning model comprise the following steps.

Content data sent from the first participant is received, wherein the content data may be data generated by the first participant during its business processing and comprising business content features.

An encryption process is performed on the content data to obtain encrypted data. By encrypting the content data, the content data can be transformed into structured data for the convenience of subsequent training processes. In the encrypted data, each row contains a globally unique identification ID to identify the data, and other columns except for the identification ID column can be semantic-free data obtained by encryption using an asymmetric encryption algorithm, thus achieving data security and privacy protection.

Sample data corresponding to a same user in the encrypted data of the first participant and encrypted data of the second participant is determined based on the encrypted data and primary key data of the second participant.

For example, the identification ID is used as primary key data for comparison, that is, when the identification ID is present in both the encrypted data of the first participant and the primary key data of the second participant, data corresponding to the identification ID in the encrypted data of the first participant and data corresponding to the identification ID in the encrypted data of the second participant are determined as sample data corresponding to the same user.

co-training of a federated learning sub-model of the first participant and a federated learning sub-model of the second participant is performed based on the sample data to obtain the federated learning model.

After determining the sample data corresponding to the same user in the encrypted data of the first participant and the encrypted data of the second participant, a training dataset can be generated by combining the sample data. Then, based on the sample data, the federated learning sub-model of the first participant and the federated learning sub-model of the second participant are co-trained to obtain the federated learning model. In the co-training of the both participants, the method of determining a loss error and a backpropagation gradient, as well as adjusting the parameters of their respective federated learning sub-models can be implemented based on an existing federated learning algorithm, which is not limited in the disclosure.

Therefore, the above technical solution does not require manual user intervention, and the entire construction process of the federated learning model can be performed automatically and directly based on the created model tasks, which can reduce user development costs and simplify the way of determining sample data of the federated learning model, thereby improving the construction efficiency of the federated learning model to a certain extent, effectively saving the user's operations, and improving the user experience.

In practical usage scenarios, a participant platform can gradually optimize its services through upgrades to further improve the construction efficiency and stability of federated learning models. Therefore, the disclosure also provides the following embodiment to facilitate the upgrading of the participant platform.

In some embodiments, the method further comprises: receiving version setting information for the first participant platform, wherein the version setting information comprises a mirror identification of a target version, the mirror identification being a GIT tag corresponding to the target version.

For example, alternative version information in the first participant platform can be displayed through an upgrade page, so that a user can select a corresponding version information to upgrade in the upgrade page. After the user selects a target version, the generation of version setting information is triggered.

version information in a configuration file corresponding to the first participant platform is updated to the mirror identification of the target version.

GIT is a distributed version control system, through which the code of each version of the participant platform can be managed. In the embodiment, the GIT tag corresponding to the target version is used as the mirror identification, so that the mirror identification can be uniquely identified based on the GIT tag. Furthermore, it can ensure that the code version and the mirror version are in one-to-one correspondence, making it easy to accurately and directly determine a mirror file corresponding to the target version that the user wants to select. Moreover, by updating the version information in the configuration file of the first participant platform to the mirror identification of the target version, the version update of the participant platform can be achieved by a mirror file corresponding to the mirror identification.

Therefore, through the above technical solution, when the version of the participant platform is updated, it can be performed by a mirror file of the target version, so that there is no need to pay attention to the operating system of the participant platform, which can improve the transferability of the participant platform, and increase the scope of use of the model construction method.

In practical application scenarios, federated learning has high requirements for the privacy and security of participant data. In order to further ensure the security of participant data, the present disclosure provides the following embodiment.

In some embodiments, before the step of associating the first configuration information pre-created by the first participant with the second configuration information pre-created by the second participant in response to receiving the first creation request sent from the first participant and configured to request the creation of the federated learning model, the method further comprises the following steps.

A resource request is received, the resource request comprising a type of requested resource and session information. The requested resource may be data of a participant or a display page of a platform, etc. For example, identity authentication for an accessing user can be achieved through the session information, wherein the session information can be stored in cookies of a browser, thereby eliminating the need for additional storage overhead on the server and saving server resources.

A display page responsive to the resource request is determined based on the requested resource and the session information in a case where the type of requested resource is a non-static resource.

A static resource usually refers to a fixed page on the front end, such as HTML (Hyper Text Markup Language), CSS (Cascading Style Sheets), JS (JavaScript), an image, and another page resource that can be displayed directly without the need of querying a database or program processing. This type of data is usually not data that is accessed by the participant alone, so a request for such data can be responded to directly. For a non-static resource, it is necessary to query a corresponding database, that is, a query must be performed to access the participant data. In this case, it is necessary to determine whether the user corresponding to the session can access the requested resource based on the session information.

Optionally, an exemplary method for determining the display page responsive to the resource request based on the requested resource and the session information comprises the following steps.

As an example, a login page of the first participant platform is determined as the display page in a case where the session information comprises a new creation identification and does not comprise user information and the requested resource is a non-login page.

In the embodiment, the session information comprises the new creation identification and does not comprise the user information, indicating that the session is in a creation authentication stage and has not yet undergone user authentication. Therefore, in a case where the requested resource is not a login page, a login page can be used as a display page to prompt the current user to log in, so as to gain access to the resource after user authentication is accomplished. This can, to some extent, ensure the reliability of the user accessing the participant data, thereby ensuring the security of the participant data.

As another example, a home page of the first participant platform is determined as the display page in a case where the session information comprises the user information and the requested resource is a login page.

In the step, the session information comprises user information, the user information being authenticated user information, that is, the user corresponding to the user information is a legal user who can access the data of the participant. Therefore, when the requested resource is a login page, the user does not need to log in again. In this case, a home page can be used as the display page, making it easy for the user to link to different pages according to their own needs, thereby facilitating the user's use. When the requested resource is not a login page, a page corresponding to the requested resource is determined as the display page to improve the user experience.

As another example, an error prompt page of the first participant platform is determined as the display page in a case where the session information comprises the user information and the requested resource is a page outside an access right corresponding to the user information. For example, the error prompt page is a 404 page.

In the embodiment, access right corresponding to each user information can be set, thereby enabling right settings for accessing users. When the authenticated user information does not have right to access a requested resource, an error prompt page can be used as the display page. For example, an administrator has access rights to obtain current user information, obtain all user information, add user information, update user information, delete user information, and so on. Middleware is used to determine whether a user is an administrator based on user information. For example, the middleware can obtain the user information. If an is admin identifier in the user information is true, it means that the user information is user information corresponding to an administrator. If the identifier is false, it means that the user information is user information corresponding to a user who is not an administrator. When a user who is not an administrator requests access to a page corresponding to an added user information function, an error prompt page can be used as a display page to inform the user of an access error or unauthorized access, and to reject the resource request, thereby providing access protection for the data of the participant and improving the security of the participant data.

Thereafter, the home page of the first participant platform is linked to a model configuration page to receive the first creation request sent from the first participant and configured to request the creation of the federated learning model in a case where the display page is the home page.

Therefore, if the display page is the home page of the first participant platform, it means that the current user has the access right to the data of the participant, that is, the user can construct a federated learning model based on the participant platform. In this case, the home page can be linked to a model configuration page in response to an operation request of the user, thereby triggering model configuration instructions in response to the model configuration page, to receive the first creation request sent from the first participant and configured to request the creation of the federated learning model, and thereby achieving the construction of the federated learning model. Therefore, through the above technical solution, the security and accuracy of the creation of the federated learning model can be improved by ensuring the legality of the accessing user's identity, further ensuring the stability of the creation of the federated learning model.

Optionally, the participant platform can also comprise structured management and processing of participant data and work order data to maintain the participant data and data produced during the construction process of the federated learning model, which can further improve the level of structured processing of the participant platform, and thus improving the efficiency of the creation of the federated learning model based on the participant platform to a certain extent.

Figure 3:
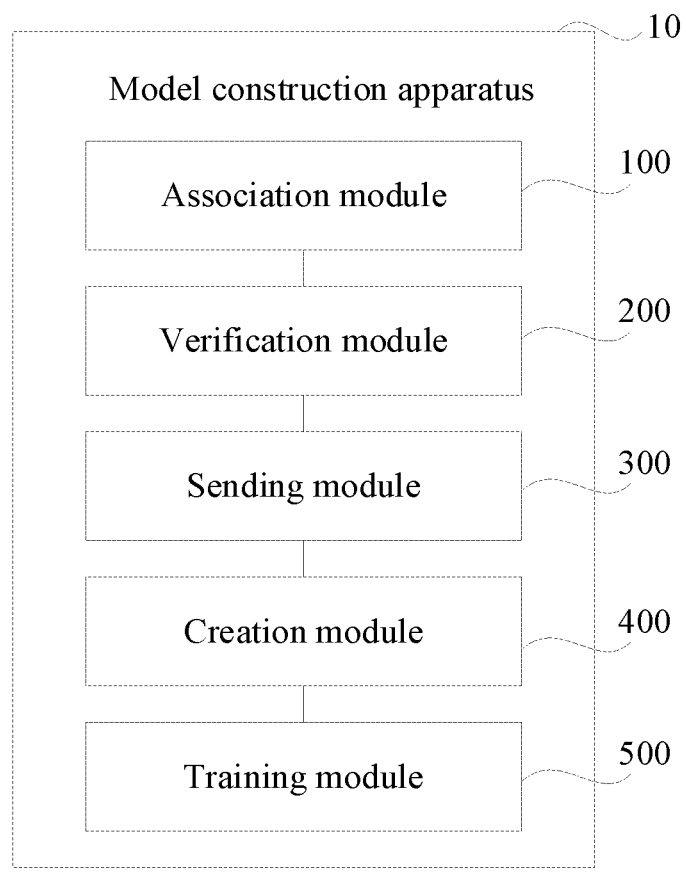
FIG. 3 is a block diagram of a model construction apparatus according to an embodiment of the present disclosure.

The present disclosure provides a model construction apparatus applied to a first participant platform, as shown in FIG. 3. The apparatus 10 comprises: an association module 100, a verification module 200, a sending module 300, a creation module 400, and a training module 500.

The association module 100 is configured to associate first configuration information pre-created by a first participant with second configuration information pre-created by a second participant in response to receiving a first creation request sent from the first participant and configured to request creation of a federated learning model.

The verification module 200 is configured to verify the first configuration information.

The sending module 300 is configured to send a second creation request for requesting the creation of the federated learning model to a second participant platform corresponding to the second participant in a case where verification of the first configuration information is passed, to cause the second participant platform to verify the second configuration information in response to the second creation request.

The creation module 400 is configured to create a first model task based on a first parameter corresponding to the first configuration information in a case of receiving a confirmation message sent from the second participant platform and configured to indicate that verification of the second configuration information is passed.

The training module 500 is configured to perform co-training based on the first model task and a second model task to obtain the federated learning model, wherein the second model task is created by the second participant platform based on a second parameter corresponding to the second configuration information in a case where the verification of the second configuration information is passed.

Optionally, the second creation request comprises the first parameter corresponding to the first configuration information to enable the second participant platform to verify the first parameter.

The training module is configured to create the first model task based on the first parameter corresponding to the first configuration information in a case of receiving the confirmation message sent from the second participant platform and configured to indicate that the verification of the second configuration information is passed and verification of the first parameter is passed.

Optionally, the apparatus further comprises an output module configured to output prompt information to the first participant in a case where the verification of the first configuration information is not passed, wherein the prompt information is configured to prompt that the verification is not passed and/or to prompt for information of a verification item that does not pass the verification.

Optionally, the first model task is a data intersection task, and the training module comprises: a receiving sub-module, an encryption sub-module, a first determination sub-module and a training sub-module.

The receiving sub-module is configured to receive content data sent from the first participant.

The encryption sub-module is configured to perform an encryption process on the content data to obtain encrypted data.

The first determination sub-module is configured to determine sample data corresponding to a same user in the encrypted data of the first participant and encrypted data of the second participant based on the encrypted data and primary key data of the second participant.

The training sub-module is configured to perform co-training of a federated learning sub-model of the first participant and a federated learning sub-model of the second participant based on the sample data to obtain the federated learning model.

Optionally, the apparatus further comprises a first receiving module and an update module.

The first receiving module is configured to receive version setting information for the first participant platform, wherein the version setting information comprises a mirror identification of a target version, the mirror identification being a GIT tag corresponding to the target version.

The update module is configured to update version information in a configuration file corresponding to the first participant platform to the mirror identification of the target version.

Optionally, the apparatus further comprises a second receiving module, a determination module and a link module.

The second receiving module is configured to receive a resource request, the resource request comprising a type of requested resource and session information, before the association module associates the first configuration information pre-created by the first participant with the second configuration information pre-created by the second participant in response to receiving the first creation request sent from the first participant and configured to request the creation of the federated learning model.

The determination module is configured to determine a display page responsive to the resource request based on the requested resource and the session information in a case where the type of requested resource is a non-static resource.

The link module is configured to link a home page of the first participant platform to a model configuration page to receive the first creation request sent from the first participant and configured to request the creation of the federated learning model in a case where the display page is the home page.

Optionally, the determination module comprises a second determination sub-module, a third determination sub-module and a fourth determination sub-module.

The second determination sub-module is configured to determine a login page of the first participant platform as the display page in a case where the session information comprises a new creation identification and does not comprise user information and the requested resource is a non-login page.

The third determination sub-module is configured to determine the home page of the first participant platform as the display page in a case where the session information comprises the user information and the requested resource is the login page.

The fourth determination sub-module is configured to determine an error prompt page of the first participant platform as the display page in a case where the session information comprises the user information and the requested resource is a page outside an access right corresponding to the user information.

Optionally, the second configuration information of the second participant is obtained by: sending a configuration information acquisition request to the second participant platform, to cause the second participant platform to determine the second configuration information based on identification information of the first participant in a case where the identification information of the first participant is obtained from the configuration information acquisition request, and send the second configuration information to the first participant platform.

Figure 4:
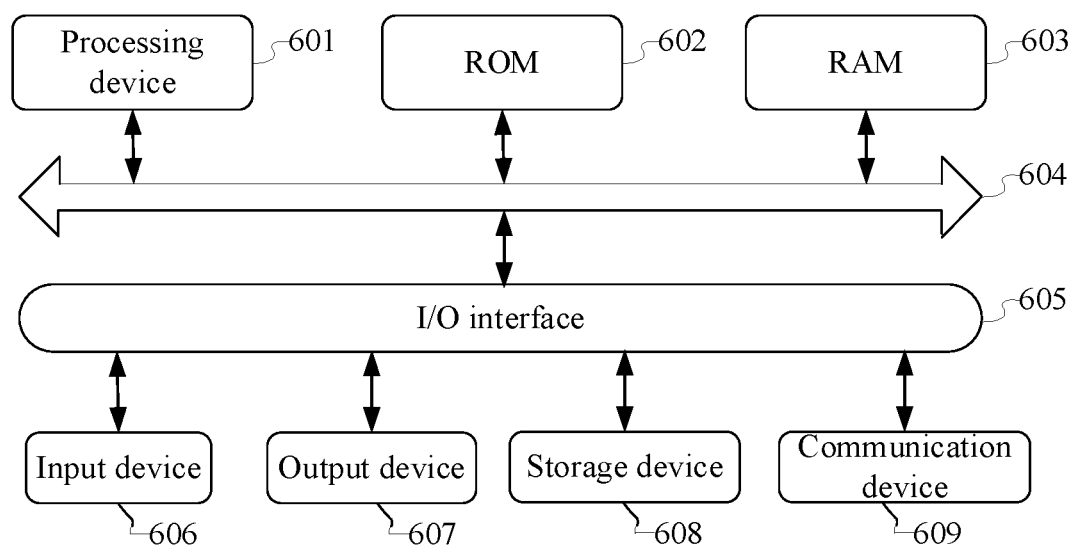
FIG. 4 is a schematic diagram illustrating a structure of an electronic device suitable for implementing embodiments of the present disclosure.

Referring to FIG. 4, FIG. 4 is a schematic diagram illustrating a structure of an electronic device 600 suitable for implementing embodiments of the present disclosure. The electronic device can be the participant platform described above. The terminal device of the embodiment of the present disclosure may comprise, but not limited to, a mobile terminal such as a mobile phone, a notebook computer, a digital broadcast receiver, a PDA (Personal Digital Assistant), a PAD (tablet computer), a PMP (Portable Multimedia Player), or on-board terminal (such as an on-board navigation terminal), or a fixed terminal such as a digital TV, a desktop computer, or the like. The electronic device shown in FIG. 4 is merely an example and should not impose any limitation on the function and scope of the embodiments of the present disclosure.

As shown in FIG. 4, the electronic device 600 may comprise a processing device (e.g., a central processing unit, a graphics processor) 601, which may perform various appropriate actions and processes according to a program stored in Read Only Memory (ROM) 602 or a program loaded from storage device 608 into Random Access Memory (RAM) 603. In RAM 603, various programs and data required for the operation of the electronic device 600 are also stored. Processing device 601, ROM 602 and RAM 603 are connected to each other through bus 604. An input/output (I/O) interface 605 is also connected to the bus 604.

Generally, the following devices can be connected to I/O interface 605: an input device 606 comprising, for example, a touch screen, a touch pad, a keyboard, a mouse, a camera, a microphone, an accelerometer, a gyroscope, etc.; an output device 607 comprising, for example, a liquid crystal display (LCD), a speaker, a vibrator, etc.; a storage device 608 comprising, for example, a magnetic tape, a hard disk, etc.; and a communication device 609. The communication device 609 may enable the electronic device 600 to communicate wirelessly or wired with other devices to exchange data. Although FIG. 4 shows the electronic device 600 with various components, it should be understood that it is not required to implement or have all of these components. Alternatively, more or fewer components can be implemented or provided.

In particular, according to an embodiment of the present disclosure, the processes described above with reference to the flowchart can be implemented as a computer software program. For example, an embodiment of the present disclosure comprises a computer program product, which comprises a computer program carried on a non-transitory computer readable medium, and containing program code for executing the method shown in the flowchart. In such an embodiment, the computer program may be downloaded and installed from the network through the communication device 609, or installed from the storage device 608, or installed from the ROM 602. When the computer program is executed by the processing device 601, the above functions defined in the method of the embodiment of the present disclosure are performed.

It should be noted that the computer-readable medium in the present disclosure may be a computer-readable signal medium or a computer-readable storage medium, or any combination of thereof. The computer readable storage medium can be, for example, but not limited to, an electronic, magnetic, optical, electromagnetic, infrared, or semiconductor system, apparatus, or device, or any combination of the above. More specific examples of the computer readable storage medium may comprise, but are not limited to: electrical connection with one or more wires, portable computer disk, hard disk, random access memory (RAM), read only memory (ROM), erasable programmable read only memory (EPROM or flash), fiber optics, portable compact disk Read only memory (CD-ROM), optical storage device, magnetic storage device, or any suitable combination of the foregoing. In the present disclosure, a computer readable storage medium can be any tangible medium that can contain or store a program, wherein the program can be used by or in connection with an instruction execution system, apparatus or device. In the present disclosure, a computer readable signal medium may comprise a data signal that is propagated in the baseband or as part of a carrier, carrying computer readable program code. Such propagated data signals can take a variety of forms comprising, but not limited to, electromagnetic signals, optical signals, or any suitable combination of the foregoing. The computer readable signal medium can also be any computer readable medium other than a computer readable storage medium, and the computer readable signal medium can transmit, propagate, or transport a program for use by or in combination with the instruction execution system, apparatus, or device. Program code embodied on a computer readable medium can be transmitted by any suitable medium, comprising but not limited to wire, fiber optic cable, RF (radio frequency), etc., or any suitable combination of the foregoing.

In some embodiments, a client and a server can communicate using any currently known or future developed network protocol such as HTTP (HyperText Transfer Protocol), and can be interconnected with any form or medium of digital data communication, e.g., a communication network. Examples of communication networks comprise a local area network ("LAN") and a wide area network ("WAN"), the Internet, and end-to-end networks (for example, ad hoc end-to-end networks), as well as any currently known or future developed networks.

The above computer-readable medium may be comprised in the electronic device described above; or it may exist alone without being assembled into the electronic device.

The computer-readable medium carries one or more programs that cause, when executed by the electronic device, the electronic device to: associate first configuration information pre-created by a first participant with second configuration information pre-created by a second participant in response to receiving a first creation request sent from the first participant and configured to request creation of a federated learning model; verify the first configuration information; send a second creation request for requesting the creation of the federated learning model to a second participant platform corresponding to the second participant in a case where verification of the first configuration information is passed, to cause the second participant platform to verify the second configuration information in response to the second creation request; create a first model task based on a first parameter corresponding to the first configuration information in a case of receiving a confirmation message sent from the second participant platform and configured to indicate that verification of the second configuration information is passed; and perform co-training based on the first model task and a second model task to obtain the federated learning model, wherein the second model task is created by the second participant platform based on a second parameter corresponding to the second configuration information in a case where the verification of the second configuration information is passed.

The computer program code for executing operations of the present disclosure may be written in one or more program design languages or combinations thereof, the program design languages comprising, but being not limited to, object-oriented program design languages, such as Java, Smalltalk, C++, etc., as well as conventional procedural program design languages, such as "C" program design language or similar program design language. A program code may be completely or partly executed on a user computer, or executed as an independent software package, partly executed on the user computer and partly executed on a remote computer, or completely executed on a remote computer or server. In the case of the remote computer, the remote computer may be connected to the user computer through various kinds of networks, comprising local area network (LAN) or wide area network (WAN), or connected to external computer (for example, through an Internet connection provided by an Internet service provider).

The flowcharts and block diagrams in the accompanying drawings illustrate the architecture, functionality, and operation of some possible implementations of systems, methods and computer program products in accordance with various embodiments of the present disclosure. In this regard, each block in the flowchart or block diagrams may represent a module, program segment, or portion of code, the module, program segment, or portion of code comprising one or more executable instructions for implementing a specified logical function. It should also be noted that, in some alternative implementations, the functions noted in the block may occur in a different order than that noted in the accompanying drawings. For example, two blocks shown in succession may be executed substantially in parallel, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or operations, or combinations of special purpose hardware and computer instructions.

The modules involved in the embodiments described in the present disclosure can be implemented either by means of software or by means of hardware. A name of a module does not constitute a limitation of the module itself under certain circumstances, for example, the association module may also be described as "a module configured to associate first configuration information pre-created by a first participant with second configuration information pre-created by a second participant in response to receiving a first creation request sent from the first participant and configured to request creation of a federated learning model".

The functions described above herein may be performed at least in part by one or more hardware logic components. For example, without limitation, exemplary types of hardware logic components that can be used comprise: a Field Programmable Gate Array (FPGA), an Application Specific Integrated Circuit (ASIC), an Application Specific Standard Product (ASSP), System on Chip (SOC), Complex Programmable Logic Device (CPLD), etc.

In the context of the present disclosure, a machine-readable medium may be a tangible medium, which may contain or store a program for use by or in combination with an instruction execution system, apparatus, or device. The machine-readable medium may be a machine-readable signal medium or a machine-readable storage medium. The machine-readable medium may comprise, but is not limited to, an electronic, magnetic, optical, electromagnetic, infrared, or semiconductor system, apparatus, or device, or any suitable combination of thereof. More specific examples of the machine-readable storage medium may comprise electrical connection with one or more wires, portable computer disk, hard disk, random access memory (RAM), read only memory (ROM), erasable programmable read only memory (EPROM or flash), fiber optics, portable compact disk Read only memory (CD-ROM), optical storage device, magnetic storage device, or any suitable combination of the foregoing.

According to one or more embodiments of the present disclosure, Example 1 provides a model construction method applied to a first participant platform, the method comprising: associating first configuration information pre-created by a first participant with second configuration information pre-created by a second participant in response to receiving a first creation request sent from the first participant and configured to request creation of a federated learning model; verifying the first configuration information; sending a second creation request for requesting the creation of the federated learning model to a second participant platform corresponding to the second participant in a case where verification of the first configuration information is passed, to cause the second participant platform to verify the second configuration information in response to the second creation request; creating a first model task based on a first parameter corresponding to the first configuration information in a case of receiving a confirmation message sent from the second participant platform and configured to indicate that verification of the second configuration information is passed; and performing co-training based on the first model task and a second model task to obtain the federated learning model, wherein the second model task is created by the second participant platform based on a second parameter corresponding to the second configuration information in a case where the verification of the second configuration information is passed.

According to one or more embodiments of the present disclosure, Example 2 provides the method of Example 1, wherein: the second creation request comprises the first parameter corresponding to the first configuration information to enable the second participant platform to verify the first parameter; and the creating of the first model task based on the first parameter corresponding to the first configuration information in a case of receiving a confirmation message sent from the second participant platform and configured to indicate that the verification of the second configuration information is passed comprises: creating the first model task based on the first parameter corresponding to the first configuration information in a case of receiving the confirmation message sent from the second participant platform and configured to indicate that the verification of the second configuration information is passed and verification of the first parameter is passed.

According to one or more embodiments of the present disclosure, Example 3 provides the method of Example 1, wherein the method further comprises: outputting prompt information to the first participant in a case where the verification of the first configuration information is not passed, wherein the prompt information is configured to prompt that the verification is not passed and/or to prompt for information of a verification item that does not pass the verification.

According to one or more embodiments of the present disclosure, Example 4 provides the method of Example 1, wherein: the first model task is a data intersection task; and the performing of the co-training based on the first model task and the second model task to obtain the federated learning model comprises: receiving content data sent from the first participant; performing an encryption process on the content data to obtain encrypted data; determining sample data corresponding to a same user in the encrypted data of the first participant and encrypted data of the second participant based on the encrypted data and primary key data of the second participant; and performing co-training of a federated learning sub-model of the first participant and a federated learning sub-model of the second participant based on the sample data to obtain the federated learning model.

According to one or more embodiments of the present disclosure, Example 5 provides the method of Example 1, wherein the method further comprises: receiving version setting information for the first participant platform, wherein the version setting information comprises a mirror identification of a target version, the mirror identification being a GIT tag corresponding to the target version; and updating version information in a configuration file corresponding to the first participant platform to the mirror identification of the target version.

According to one or more embodiments of the present disclosure, Example 6 provides the method of Example 1, wherein before associating the first configuration information pre-created by the first participant with the second configuration information pre-created by the second participant in response to receiving the first creation request sent from the first participant and configured to request the creation of the federated learning model, the method further comprises: receiving a resource request, the resource request comprising a type of requested resource and session information; determining a display page responsive to the resource request based on the requested resource and the session information in a case where the type of requested resource is a non-static resource; and linking a home page of the first participant platform to a model configuration page to receive the first creation request sent from the first participant and configured to request the creation of the federated learning model in a case where the display page is the home page.

According to one or more embodiments of the present disclosure, Example 7 provides the method of Example 6, wherein the determining of the display page responsive to the resource request based on the requested resource and the session information comprises: determining a login page of the first participant platform as the display page in a case where the session information comprises a new creation identification and does not comprise user information and the requested resource is a non-login page; determining the home page of the first participant platform as the display page in a case where the session information comprises the user information and the requested resource is the login page; or determining an error prompt page of the first participant platform as the display page in a case where the session information comprises the user information and the requested resource is a page outside an access right corresponding to the user information.

According to one or more embodiments of the present disclosure, Example 8 provides a model construction apparatus applied to a first participant platform, the apparatus comprising: an association module configured to associate first configuration information pre-created by a first participant with second configuration information pre-created by a second participant in response to receiving a first creation request sent from the first participant and configured to request creation of a federated learning model; a verification module configured to verify the first configuration information; a sending module configured to send a second creation request for requesting the creation of the federated learning model to a second participant platform corresponding to the second participant in a case where verification of the first configuration information is passed, to cause the second participant platform to verify the second configuration information in response to the second creation request; a creation module configured to create a first model task based on a first parameter corresponding to the first configuration information in a case of receiving a confirmation message sent from the second participant platform and configured to indicate that verification of the second configuration information is passed; and a training module configured to perform co-training based on the first model task and a second model task to obtain the federated learning model, wherein the second model task is created by the second participant platform based on a second parameter corresponding to the second configuration information in a case where the verification of the second configuration information is passed.

According to one or more embodiments of the present disclosure, Example 9 provides a non-transitory computer-readable medium having a computer program stored thereon, wherein the computer program, when executed by a processing device, implements the steps of the method described in any one of Example 1 to Example 7.

According to one or more embodiments of the present disclosure, Example 10 provides an electronic device, comprising: a storage device having a computer program stored thereon; and a processing device configured to execute the computer program in the storage device to implement the steps of the method described in any one of Example 1 to Example 7.

According to some embodiments of the present disclosure, a computer program is further provided, the computer program comprising: instructions that, when executed by a processor, cause the processor to implement the model construction method described above.

According to some embodiments of the present disclosure, a computer program product is further provided, the computer program product comprising instructions that, when executed by a processor, cause the processor to implement the model construction method described above.

The above description is only preferred embodiments of the present disclosure and an explanation of the applied technical principles. Those skilled in the art should understand that the scope of disclosure involved in the disclosure is not limited to the technical solutions formed by the specific combination of the above technical features, and should also cover other technical solutions formed by any combination of the above technical features or their equivalent features without departing from the disclosed concept, for example, technical solutions formed by replacing the above features with technical features having similar functions to (but not limited to) those disclosed in the present disclosure.

In addition, although the operations are depicted in a specific order, this should not be understood as requiring these operations to be performed in the specific order shown or performed in a sequential order. Under certain circumstances, multitasking and parallel processing may be advantageous. Likewise, although several specific implementation details are comprised in the above discussion, these should not be construed as limiting the scope of the present disclosure. Certain features that are described in the context of separate embodiments can also be implemented in combination in a single embodiment. Conversely, various features described in the context of a single embodiment can also be implemented in multiple embodiments individually or in any suitable subcombination.

Although the subject matter has been described in language specific to structural features and/or logical actions of the method, it should be understood that the subject matter defined in the appended claims is not necessarily limited to the specific features or actions described above. On the contrary, the specific features and actions described above are merely exemplary forms of implementing the claims. For the apparatus described in the above embodiment, the specific ways in which the various modules of the apparatus operate have been described in detail in the embodiments of the relevant method, and will not be explained in detail here.

What is claimed is:

1. A model construction method applied to a first participant platform, comprising:
    associating first configuration information pre-created by a first participant with second configuration information pre-created by a second participant in response to receiving a first creation request sent from the first participant and configured to request creation of a federated learning model;
    verifying the first configuration information;
    sending a second creation request for requesting the creation of the federated learning model to a second participant platform corresponding to the second participant in a case where verification of the first configuration information is passed, to cause the second participant platform to verify the second configuration information in response to the second creation request;
    creating a first model task based on a first parameter corresponding to the first configuration information in a case of receiving a confirmation message sent from the second participant platform and configured to indicate that verification of the second configuration information is passed; and
    performing co-training based on the first model task and a second model task to obtain the federated learning model, wherein the second model task is created by the second participant platform based on a second parameter corresponding to the second configuration information in a case where the verification of the second configuration information is passed, wherein
    the first model task is a data intersection task, and
    the performing of the co-training based on the first model task and the second model task to obtain the federated learning model comprises:
        receiving content data sent from the first participant;
        performing an encryption process on the content data to obtain encrypted data;
        determining sample data corresponding to a same user in the encrypted data of the first participant and encrypted data of the second participant based on the encrypted data and primary key data of the second participant; and
        performing co-training of a federated learning sub-model of the first participant and a federated learning sub-model of the second participant based on the sample data to obtain the federated learning model.

2. The model construction method according to claim 1, wherein:
    the second creation request comprises the first parameter corresponding to the first configuration information to enable the second participant platform to verify the first parameter; and
    the creating of the first model task based on the first parameter corresponding to the first configuration information in a case of receiving a confirmation message sent from the second participant platform and configured to indicate that the verification of the second configuration information is passed comprises:
        creating the first model task based on the first parameter corresponding to the first configuration information in a case of receiving the confirmation message sent from the second participant platform and configured to indicate that the verification of the second configuration information is passed and verification of the first parameter is passed.

3. The model construction method according to claim 1, further comprising:
    outputting prompt information to the first participant in a case where the verification of the first configuration information is not passed, wherein the prompt information is configured to prompt that the verification is not passed and/or to prompt for information of a verification item that does not pass the verification.

4. The model construction method according to claim 1, further comprising:
    receiving version setting information for the first participant platform, wherein the version setting information comprises a mirror identification of a target version, the mirror identification being a distributed version control system (GIT) tag corresponding to the target version; and
    updating version information in a configuration file corresponding to the first participant platform to the mirror identification of the target version.

5. The model construction method according to claim 1, further comprising:
    receiving a resource request, the resource request comprising a type of requested resource and session information, before associating the first configuration information pre-created by the first participant with the second configuration information pre-created by the second participant in response to receiving the first creation request sent from the first participant and configured to request the creation of the federated learning model;

determining a display page responsive to the resource request based on the requested resource and the session information in a case where the type of requested resource is a non-static resource; and linking a home page of the first participant platform to a model configuration page to receive the first creation request sent from the first participant and configured to request the creation of the federated learning model in a case where the display page is the home page.

6. The model construction method according to claim 5, wherein the determining of the display page responsive to the resource request based on the requested resource and the session information comprises:

determining a login page of the first participant platform as the display page in a case where the session information comprises a new creation identification and does not comprise user information and the requested resource is a non-login page;

determining the home page of the first participant platform as the display page in a case where the session information comprises the user information and the requested resource is the login page; or determining an error prompt page of the first participant platform as the display page in a case where the session information comprises the user information and the requested resource is a page outside an access right corresponding to the user information.

7. The model construction method according to claim 1, wherein the second configuration information of the second participant is obtained by:

sending a configuration information acquisition request to the second participant platform, to cause the second participant platform to determine the second configuration information based on identification information of the first participant in a case where the identification information of the first participant is obtained from the configuration information acquisition request, and send the second configuration information to the first participant platform.

8. A non-transitory computer-readable storage medium having a computer program stored thereon, wherein the computer program, when executed by a processing device, causes the processing device to:

associate first configuration information pre-created by a first participant with second configuration information pre-created by a second participant in response to receiving a first creation request sent from the first participant and configured to request creation of a federated learning model;

verify the first configuration information;

send a second creation request for requesting the creation of the federated learning model to a second participant platform corresponding to the second participant in a case where verification of the first configuration information is passed, to cause the second participant platform to verify the second configuration information in response to the second creation request;

create a first model task based on a first parameter corresponding to the first configuration information in a case of receiving a confirmation message sent from the second participant platform and configured to indicate that verification of the second configuration information is passed, the first model task being a data intersection task; and perform co-training based on the first model task and a second model task to obtain the federated learning model, wherein the second model task is created by the second participant platform based on a second parameter corresponding to the second configuration information in a case where the verification of the second configuration information is passed;

receive content data sent from the first participant;

perform an encryption process on the content data to obtain encrypted data;

determine sample data corresponding to a same user in the encrypted data of the first participant and encrypted data of the second participant based on the encrypted data and primary key data of the second participant; and perform co-training of a federated learning sub-model of the first participant and a federated learning sub-model of the second participant based on the sample data to obtain the federated learning model.

9. The non-transitory computer-readable storage medium according to claim 8, wherein:

the second creation request comprises the first parameter corresponding to the first configuration information to enable the second participant platform to verify the first parameter; and the computer program, when executed by the processing device, causes the processing device to create the first model task based on the first parameter corresponding to the first configuration information in a case of receiving the confirmation message sent from the second participant platform and configured to indicate that the verification of the second configuration information is passed and verification of the first parameter is passed.

10. The non-transitory computer-readable storage medium according to claim 8, wherein the computer program, when executed by the processing device, further causes the processing device to output prompt information to the first participant in a case where the verification of the first configuration information is not passed, wherein the prompt information is configured to prompt that the verification is not passed and/or to prompt for information of a verification item that does not pass the verification.

11. The non-transitory computer-readable storage medium according to claim 8, wherein the computer program, when executed by the processing device, further causes the processing device to:

receive version setting information for the first participant platform, wherein the version setting information comprises a mirror identification of a target version, the mirror identification being a GIT tag corresponding to the target version; and update version information in a configuration file corresponding to the first participant platform to the mirror identification of the target version.

12. The non-transitory computer-readable storage medium according to claim 8, wherein the computer program, when executed by the processing device, further causes the processing device to:

receive a resource request, the resource request comprising a type of requested resource and session information;

determine a display page responsive to the resource request based on the requested resource and the session information in a case where the type of requested resource is a non-static resource; and link a home page of the first participant platform to a model configuration page to receive the first creation request sent from the first participant and configured to request the creation of the federated learning model in a case where the display page is the home page.

13. An electronic device, comprising:
a storage device having a computer program stored thereon; and
a hardware processor configured to execute the computer program in the storage device to:
associate first configuration information pre-created by a first participant with second configuration information pre-created by a second participant in response to receiving a first creation request sent from the first participant and configured to request creation of a federated learning model;
verify the first configuration information;
send a second creation request for requesting the creation of the federated learning model to a second participant platform corresponding to the second participant in a case where verification of the first configuration information is passed, to cause the second participant platform to verify the second configuration information in response to the second creation request;
create a first model task based on a first parameter corresponding to the first configuration information in a case of receiving a confirmation message sent from the second participant platform and configured to indicate that verification of the second configuration information is passed, the first model task being a data intersection task; and
perform co-training based on the first model task and a second model task to obtain the federated learning model, wherein the second model task is created by the second participant platform based on a second parameter corresponding to the second configuration information in a case where the verification of the second configuration information is passed;
receive content data sent from the first participant;
perform an encryption process on the content data to obtain encrypted data;
determine sample data corresponding to a same user in the encrypted data of the first participant and encrypted data of the second participant based on the encrypted data and primary key data of the second participant; and
perform co-training of a federated learning sub-model of the first participant and a federated learning sub-model of the second participant based on the sample data to obtain the federated learning model.

14. The electronic device according to claim 13, wherein:
the second creation request comprises the first parameter corresponding to the first configuration information to enable the second participant platform to verify the first parameter; and
the hardware processor is configured to execute the computer program in the storage device to create the first model task based on the first parameter corresponding to the first configuration information in a case of receiving the confirmation message sent from the second participant platform and configured to indicate that the verification of the second configuration information is passed and verification of the first parameter is passed.

15. The electronic device according to claim 13, wherein the hardware processor is further configured to execute the computer program in the storage device to output prompt information to the first participant in a case where the verification of the first configuration information is not passed, wherein the prompt information is configured to prompt that the verification is not passed and/or to prompt for information of a verification item that does not pass the verification.

16. The electronic device according to claim 13, wherein the hardware processor is further configured to execute the computer program in the storage device to:
receive version setting information for the first participant platform, wherein the version setting information comprises a mirror identification of a target version, the mirror identification being a GIT tag corresponding to the target version; and
update version information in a configuration file corresponding to the first participant platform to the mirror identification of the target version.

17. The electronic device according to claim 13, wherein the hardware processor is further configured to execute the computer program in the storage device to:
receive a resource request, the resource request comprising a type of requested resource and session information;
determine a display page responsive to the resource request based on the requested resource and the session information in a case where the type of requested resource is a non-static resource; and
link a home page of the first participant platform to a model configuration page to receive the first creation request sent from the first participant and configured to request the creation of the federated learning model in a case where the display page is the home page.

* * * * *